Patented Mar. 4, 1941

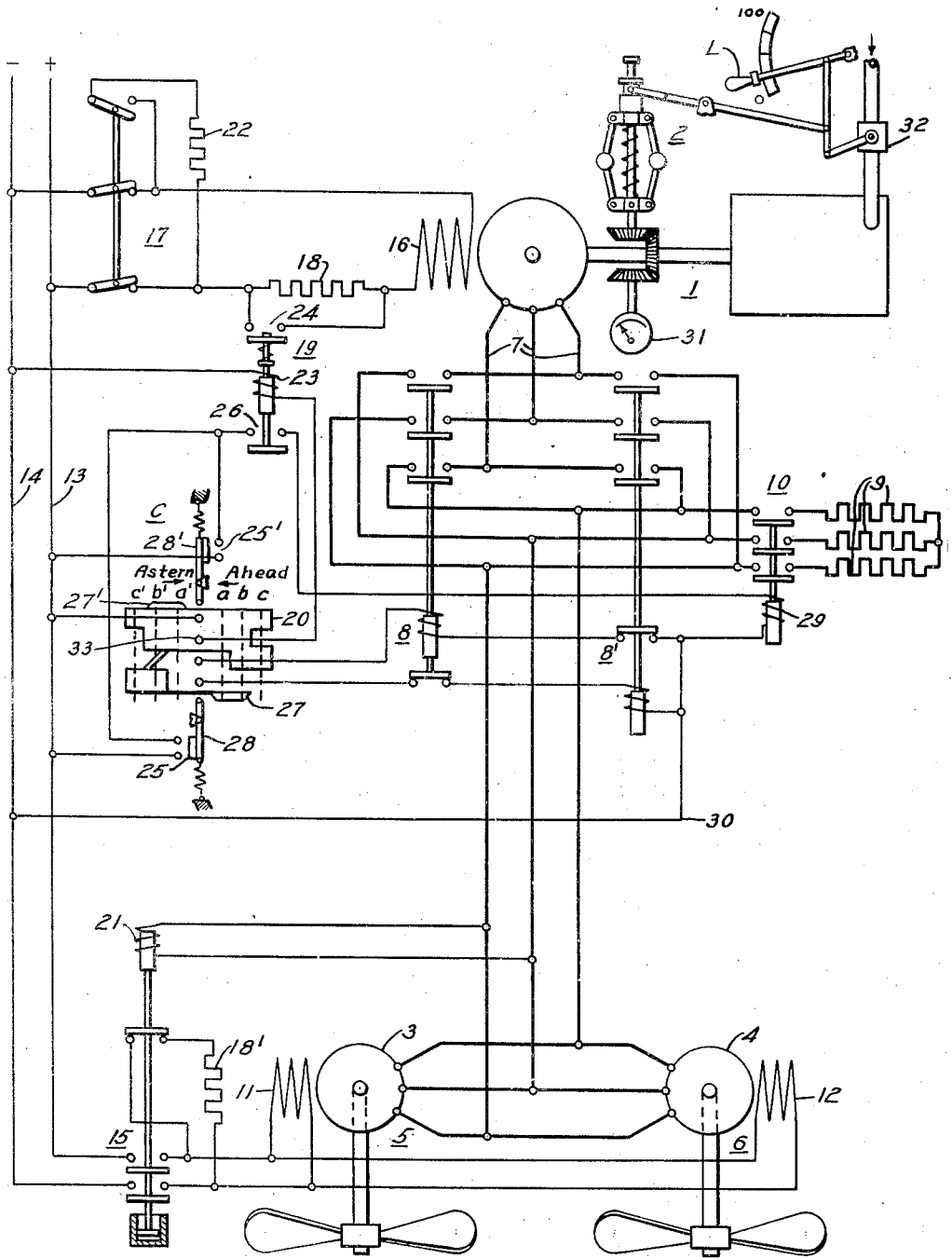

2,233,634

UNITED STATES PATENT OFFICE 2,233,634

CONTROL SYSTEM

John S. Newton, Drexel Hill, Pa., assignor to Westinghouse Electric & Manufacturing Company, East Pittsburgh, Pa., a corporation of Pennsylvania Application January 5, 1940, Serial No. 312,523

11 Claims. (Cl. 172—3)

My invention relates to a control system for effecting dynamic braking of an alternating-current generator and a synchronous motor fed thereby during reversing operation of the synchronous motor. My invention is particularly applicable to marine propulsion systems driven by a turbo-generator or Diesel generator set, the generator of which energizes one or more synchronous motors, which motors are mechanically coupled to the propeller which drives the ship.

In ship propulsion systems, particularly those of medium size, many advantages can be gained by dynamic braking the turbine generator set and motors to approximately 25% speed before reversing. It is generally desirable to reduce the weight and size of the electrical apparatus to a minimum, and in so doing the turbine generator set speed is usually increased to a maximum in order to reduce the size of the turbine.

Limitations on temperature rise of the motors or generators are not especially important as long as machines operate satisfactorily. However, in the attempt to use machines of smaller size, an outstanding limiting factor in the overall application is the amount of excitation required on the generator in order to maintain its voltage while the motors are being reversed at full speed.

Another consideration affecting the size of the equipment is the amount of torque required to reverse the propellers. According to tests it has been shown that approximately 90% torque is required for reversal with the propellers running at approximately 35% speed in the ahead direction and with the ship running at full ahead. It has, therefore, been necessary to design motors and generators to deliver 90% reversal torque, and this requires oversize machines.

An object of my invention is to provide a control system for effecting smooth reversal of one or more synchronous motors in a minimum period of time.

Another object of my invention is to provide a method of reversal for one or more synchronous motors which makes it possible to use motors of minimum size and weight.

Another object of my invention is to provide a control system for reversing one or more synchronous motors which positively insures synchronization after the motor or motors have been reversed.

Other objects and advantages will become more apparent from a study of the following specification when considered in conjunction with the accompanying drawing, in which the single figure is a diagrammatic showing of a marine propulsion control system embodying the principles of my invention.

Referring more particularly to the single figure, numeral 1 denotes a turbo-generator set or other suitable prime mover. The turbo-generator set has a governor 2 which may be set at any desired value by lever L so as to restrict the amount of steam (or fuel in a Diesel engine, for example) going through valve 32 to the prime mover so as to adjust the speed thereof. The generator 10 of the turbo-generator set energizes the stator or armature windings 3 and 4 of synchronous motors 5 and 6, respectively, through buses 7. Reversing contactors 8 and 8' are provided in the buses 7 for the purpose of reversing the phase relationship existing between the generator and the respective motors. A dynamic braking resistor 9 may be applied across buses 7 by closing contact 10. The synchronous motors 5 and 6 have field or rotor windings 11 and 12, respectively, which are energized by a source of direct-current potential represented by supply conductors 13 and 14 through contactor 15. Likewise, the field winding 16 of the generator is also energized from the same direct-current source through switch 17. A discharge resistor 22 of the conventional type is used in well known manner for field 16. In series with field winding 16 is a resistor 18 which may be shunted by contactor 19.

The operation of the control system in accordance with my invention probably will be best understood by going through the successive steps necessary for effecting reversing of the synchronous motors, that is, the successive steps necessary to go from full speed ahead to full speed astern. Assume that controller C is at the c position "ahead." Thus, reversing contactor 8 is energized.

1. The turbine governor is preferably set to 25% speed. This setting is not very critical so that the setting may be anywhere from 20% to 50% of normal speed.

2. The controller C is moved from the a position "ahead" to the b position "ahead." This will establish a circuit from bus 13 through the controller segment 20, to finger 33, coil 23 of control relay 19, to bus 14.

3. Operation of relay 19 first closes the spring biased contact members 24 to shunt the resistor 18 to thus over-excite the field 16 to provide a large pull-out torque and thus very stable interconnection between the main generator of the turbo-generator set 1 and the motors 5 and 6.

4. The operation of the controller to the b position also closes the switch contacts 25 through operation of cam 27 on pivoted lever 28, and since the operation of the control relay closes the contact members 26 an instant after the generator is heavily excited, a circuit is established from bus 13 through switch contact 25, contact members 26, actuating coil 29 of dynamic braking contactor 10, and conductor 30 to negative bus 14.

5. Closing of dynamic braking contactor 10 connects the dynamic braking resistor 9 to both motors 5 and 6 and to the heavily excited generator. Very effective braking thus takes place and the speed of the generator and the motors is thus rapidly reduced.

6. The attendant watches the speed indicating device 31 and when a speed of 25% of normal speed is indicated, the controller C is moved to the $a$ position.

7. Movement of the controller to the $a$ position interrupts the circuit for the coil of the directional contactor 8, whereby the generator is disconnected from the motors. The braking will, however, continue.

8. The speed will decrease and the voltage on the coil 21, now being connected to the motors only, will decrease and coil 21 will become deenergized at about 5% to 10% of the motor speeds. The switch 15 opens the field circuits and the discharge resistor 18' is connected to the fields 11 and 12.

9. When the attendant notes that the motor fields have thus been disconnected, the controller is moved to the "off" position, whereby the cam 27 releases lever 28 to open switch contacts 25.

10. Opening of switch contacts 25 deenergizes coil 29 whereby the dynamic braking resistor 9 is disconnected from the motors.

11. The controller is now moved through the $a'$ position to the $b'$ position for astern operation.

12. The directional contactor 8' is now energized and the motors are thus connected to the generator for reverse operation. The speed in the reverse direction builds up. The coil 21, being again connected to a high voltage, is energized sufficiently to pull-in.

13. At about 25% of full speed the fields 11 and 12 are connected to the buses 13 and 14 and the motors synchronize, which synchronization is aided by the still heavily excited generator field.

14. The controller is then moved to the $c'$ position whereby the control relay 19 is deenergized and the generator field is energized at normal value.

15. The speed control lever L may then be moved to any speed desired.

It will be apparent that if instead of going from full speed ahead to full speed astern, it were desired to go from full speed astern to full speed ahead, the operator would move controller C from position $c'$ to position $c$ through the following successive steps or positions: $c'$—$b'$—$a'$ "off" position $a$—$b$—$c$. In doing so, substantially the same cycle, such as described above, will be repeated except, of course, that now the ship will go from an astern direction to a forward direction instead of from a forward direction to an astern direction. The symmetrical shape of the upper segments of controller C is evidence of repetition of the same cycle of operation, irrespective of the direction of movement of the controller; the lower segments are different, of course, because they control different reversing contactors (that is, 8 and 8'). Furthermore, cam 27' will operate levers 28' to close contact members 25' in positions $b'$ and $a'$. This will have the same effect as the previously described corresponding parts, cam 27, lever 28 and contact members 25, respectively, which operated in positions $b$ and $a$, inasmuch as contact members 25 and 25' are connected in parallel.

By using the dynamic braking scheme for both motors and generators, it is unnecessary to design the generator so that it will maintain 100% volts per cycle during the maneuvering period. It is necessary to use some "over excitation" of the generator field in order to be sure of satisfactory pull-in conditions with the motors running at slightly less than 25% speed in the reverse direction while the ship is still moving ahead. However, such over-excitation is not absolutely necessary and the motors may be reversed and synchronized without it.

The advantages of the scheme in accordance with my invention are as follows:

1. The motors can be fully rated from a temperature standpoint.

2. The generator can be fully rated from a temperature standpoint.

3. The power during maneuvering will be dissipated in a dynamic braking resistor instead of in the motor damper windings.

4. The generator excitation required for the maneuvering condition is reduced from approximately 10 times normal kilowatts to 4 or 5 times normal kilowatts, which materially reduces the size of the excitation equipment.

5. Since the governor setting of the turbo-generator is set at a definite speed (say between 20% and 50% normal speed), this insures synchronization as distinguished from previous methods wherein the steam of the turbo-generator is completely shut off thereby allowing the generator speed to go to nearly zero before synchronization occurs. At such low speed the resistance of the machine may be high enough so that sufficient voltage required to overcome the same is not available due to the almost zero value of the generator speed. Also in going to such low speed the torsional natural frequency of vibration of either the turbo-generator (usually 10 to 60 cycles) or of the propeller (usually about 2 to 5 cycles) may be encountered causing severe vibration and damage to the equipment.

6. By maintaining the field energization of both motor and generator when dynamic braking occurs, there is a savings of time since there is no necessity for awaiting the deenergization of the field winding and subsequent building up thereof as involved in dynamic braking systems in the prior art.

7. Another advantage of my system is that the motor is allowed to act for a short time as an induction motor before synchronization is effected.

8. Since a resistor in my scheme can be so designed as to reduce the speed to approximately 5% of full speed while the turbo-generator set is operating on its governor at its idling speed (20 to 50% of full speed) the duty on the squirrel-cage damper winding is reduced. In other words, the damper winding need be designed to accelerate the motor only from a negative 5% speed to the 20 to 50% synchronizing speed. This feature is particularly applicable only to a synchronous motor rather than to an induction motor because the latter has a damper or squirrel-cage winding which is much heavier than that in a synchronous motor, hence there is not the same necessity to reduce the duty on the winding in reversing, that is, the motor size will not be greatly affected.

9. By applying the dynamic braking resistor to the system before reversing the phase relationship between the generator and motor, all the machines are braked simultaneously and synchronously thereby providing smooth braking operation as distinguished from the scheme in which the dynamic braking resistor is applied after phase reversal wherein heavy and intermittent torque pulsations occur due to slipping of the poles causing excessive vibration and unsmooth braking.

While the control system in accordance with my invention has been described in connection with a ship propulsion system, it will be obvious that it has many other applications, and in fact, is applicable wherever it is desired to reverse one or more synchronous motors irrespective of the type of load. Furthermore, while two motors are shown, only a single motor may be used instead, or even three or more motors in parallel.

I am, of course, aware that others, particularly after having had the benefit of the teachings, of my invention, may devise other systems of control embodying my invention, and I, therefore, do not wish to be limited to the specific showings made in the drawing and the descriptive disclosure hereinbefore made, but wish to be limited only by the scope of the appended claims and such prior art as may be pertinent.

I claim as my invention:

1. A ship propulsion system comprising a prime mover, a generator mechanically coupled thereto, a motor electrically connected to and fed by said generator by a plurality of buses, a propeller coupled to said motor, said generator and motor having field windings, respectively, a resistor, means for connecting said resistor across said buses while said field windings remain energized for effecting dynamic braking of said generator and motor, simultaneously.

2. A ship propulsion system comprising a prime mover, an alternating current generator mechanically coupled thereto, a synchronous motor electrically connected to and fed by said generator by a plurality of buses, a propeller coupled to said motor, said generator and motor having field windings, respectively, a resistor, means for connecting said resistor across said buses while said field windings remain energized for effecting dynamic braking of said generator and motor, simultaneously.

3. A ship propulsion system comprising a prime mover, an alternating current generator mechanically coupled thereto, a plurality of synchronous motors electrically connected to and fed by said generator by a plurality of buses, a propeller coupled to each of said motors, said generator and motors having field windings, respectively, a resistor, means for connecting said resistor across said buses while said field windings remain energized for effecting dynamic braking of said generator and motor simultaneously and synchronously.

4. A ship propulsion system comprising a prime mover, an alternating current generator mechanically coupled thereto, a plurality of synchronous motors electrically connected to and fed by said generator by a plurality of buses, a propeller coupled to each of said motors, said generator and motors having field windings, respectively, a resistor means for connecting said resistor across said buses while said field windings remain energized for effecting dynamic braking of said generator and motor simultaneously and synchronously, switch means for interrupting the feed through said buses, means for disconnecting said resistor from said buses and for simultaneously reversing the phase relationship of said buses.

5. A ship propulsion system comprising a prime mover, an alternating current generator mechanically coupled thereto, a plurality of synchronous motors electrically connected to and fed by said generator by a plurality of buses, a propeller coupled to each of said motors, said generator and motors having field windings, respectively, a resistor, means for connecting said resistor across said buses while said field windings remain energized for effecting dynamic braking of said generator and motor simultaneously and synchronously, switch means for interrupting the feed through said buses, switching means for inserting a resistor in series with the generator field winding and simultaneously disconnecting said first mentioned resistor and for reversing the phase relationship of said buses, and means for synchronizing said motors.

6. In a ship propulsion system comprising a prime mover, an alternating current generator mechanically coupled thereto, a synchronous motor electrically connected to and fed by said generator by a plurality of buses, and a propeller coupled to said motor, the motor and generators having field windings, respectively, the method of reversing said motor which comprises decreasing the speed of the prime mover to a predetermined value, inserting a resistor across said buses for effecting synchronous dynamic braking of all machines thereafter interrupting the circuit between said generator and resistor and interrupting the circuit through the resistor and the motor field winding but not through said generator field winding, and reversing the phase relationship between the generator and motor so as to effect reversal of the motor thereafter reclosing the circuit through the motor field winding and synchronizing the motor.

7. In a ship propulsion system comprising a prime mover, an alternating current generator mechanically coupled thereto, a synchronous motor electrically connected to and fed by said generator by a plurality of buses, and a propeller coupled to said motor, the motor and generators having field windings, respectively, the method of reversing said motor which comprises decreasing the speed of the prime mover to a predetermined value, increasing the generator excitation, inserting a resistor across said buses for effecting synchronous dynamic braking of all machines thereafter interrupting the circuit between said generator and resistor and interrupting the circuit through the resistor and the motor field winding but not through said generator field winding, and reversing the phase relationship between the generator and motor so as to effect reversal of the motor thereafter reclosing the circuit through the motor field winding and synchronizing the motor, thereafter reducing the generator excitation to its original value.

8. In a ship propulsion system comprising a prime mover, an alternating current generator mechanically coupled thereto, a plurality of synchronous motors electrically connected to and fed by said generator by a plurality of buses, and a propeller coupled to said motors, the motors and generators having field windings, respectively, the method of reversing said motors which comprises decreasing the speed of the prime mover to a predetermined value, inserting a resistor across said buses for effecting synchronous dynamic braking of all machines, thereafter interrupting the circuit between said generator and resistor and interrupting the circuit through the resistor and the motor field windings but not through said generator field windings, and reversing the phase relationship between the generator and motors so as to effect reversal of the motor thereafter reclosing the circuit through the motor field windings and synchronizing the motors.

9. In a ship propulsion system comprising a prime mover, an alternating current generator mechanically coupled thereto, a plurality of synchronous motors electrically connected to and fed by said generator by a plurality of buses, and a propeller coupled to said motors, the motors and generators having field windings, respectively, the method of reversing said motors which comprises decreasing the speed of the prime mover to a predetermined value, increasing the generator excitation inserting a resistor across said buses for effecting synchronous dynamic braking of all machines, thereafter interrupting the circuit between said generator and resistor and interrupting the circuit through the resistor and the motor field windings but not through said generator field windings, and reversing the phase relationship between the generator and motors so as to effect reversal of the motor thereafter reclosing the circuit through the motor field windings and synchronizing the motors.

10. A control system comprising a prime mover, an alternating current generator mechanically coupled thereto, a synchronous motor electrically connected to and fed by said generator by a plurality of buses, the motor and generators having field windings, respectively, the method of reversing said motor which comprises decreasing the speed of the prime mover to a predetermined value, inserting a resistor across said buses for effecting synchronous dynamic braking of all machines thereafter interrupting the circuit between said generator and resistor and interrupting the circuit through the resistor and the motor field winding but not through said generator field winding, and reversing the phase relationship between the generator and motor so as to effect reversal of the motor thereafter reclosing the circuit through the motor field winding and synchronizing the motor.

11. A control system comprising a prime mover, an alternating current generator mechanically coupled thereto, a synchronous motor electrically connected to and fed by said generator by a plurality of buses, the motor and generators having field windings, respectively, the method of reversing said motor which comprises decreasing the speed of the prime mover to a predetermined value, increasing the generator excitation, inserting a resistor across said buses for effecting synchronous dynamic braking of all machines thereafter interrupting the circuit between said generator and resistor and interrupting the circuit through the resistor and the motor field winding but not through said generator field windings, and reversing the phase relationship between the generator and motor so as to effect reversal of the motor thereafter reclosing the circuit through the motor field winding and synchronizing the motor, thereafter reducing the generator excitation to its original value.

JOHN S. NEWTON.